No. 831,443. PATENTED SEPT. 18, 1906.
W. E. KENNER.
TURPENTINE BOX.
APPLICATION FILED MAR. 17, 1906.
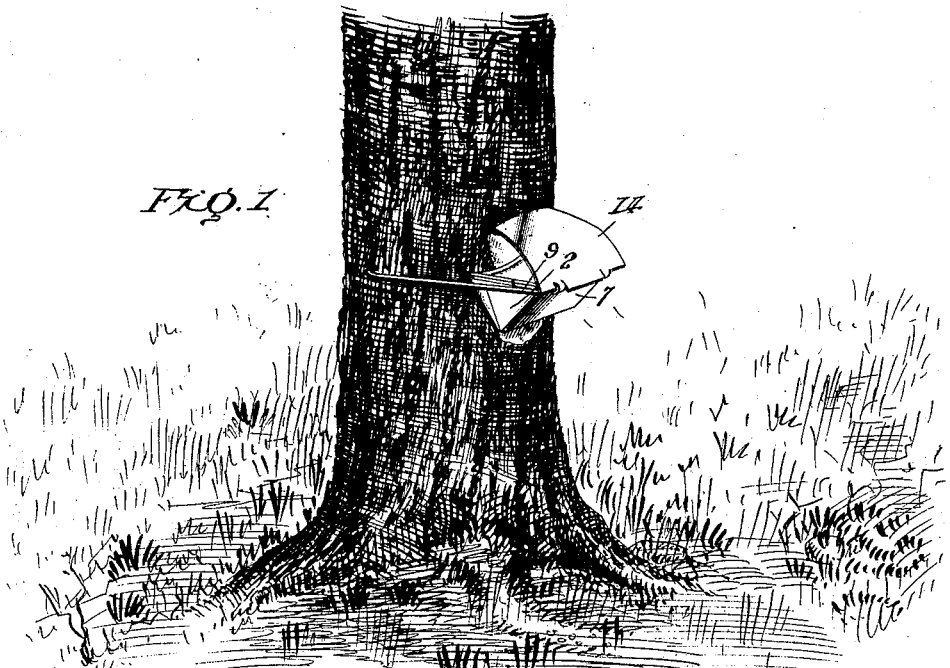
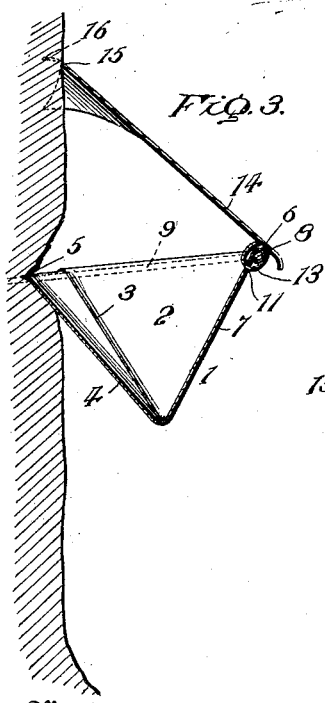
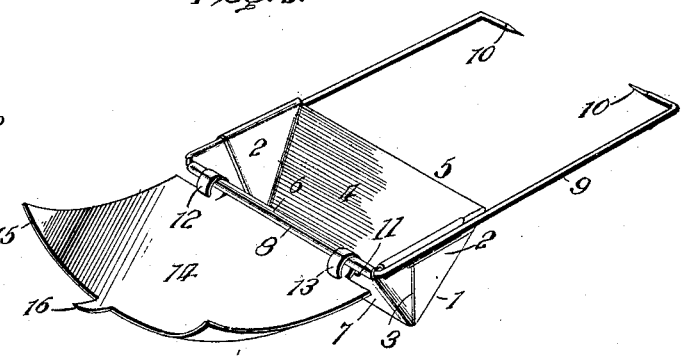
Witnesses
Louis H. Schmidt.
A. W. Ehrling.
Inventor
W. E. Kenner
By A. S. Pattison,
Attorney

UNITED STATES PATENT OFFICE.

WILLIAM EDWARD KENNER, OF BRUNSWICK, GEORGIA.

TURPENTINE-BOX.

No. 831,443.  Specification of Letters Patent.  Patented Sept. 18, 1906.

Application filed March 17, 1906. Serial No. 306,629.

*To all whom it may concern:*

Be it known that I, WILLIAM EDWARD KENNER, a citizen of the United States, residing at Brunswick, in the county of Glynn and State of Georgia, have invented certain new and useful Improvements in Turpentine-Boxes, of which the following is a specification, reference being had therein to the accompanying drawings.

My invention relates to improvements in turpentine-boxes.

The object of my invention is to provide a turpentine-box with which it is not necessary to box the tree to apply the same, and thus saving time in the application of the box to the tree, and also saving the tree, as the boxing a tree weakens it, and it is often blown over by the wind.

Another object of my invention is to provide a turpentine-box of this character which can be applied or removed from the tree for taking the turpentine from the box, thus saving time and labor in gathering the turpentine, which also prevents the water and trash from falling into the box and forcing the turpentine out of the box and the wind from blowing the turpentine out of the box. This not only saves a great amount of turpentine, which is now lost in the gathering of the same, but also reduces the liability of fires, as the body of the tree below the box will not become full of the waste turpentine.

A still further object of my invention is to provide a more simple, cheap, and effective box of this character, in which the tree does not have to be scarified deep, thus allowing the bark to heal over the cut, and greatly save the trees.

In the accompanying drawings, Figure 1 is a perspective view of my improved box applied to the tree. Fig. 2 is an enlarged perspective view of the box removed and the cover swung open. Fig. 3 is a transverse vertical sectional view of the box applied.

Referring now to the drawings, 1 represents my improved turpentine-box proper, which, as shown, is made of a single piece of metal to form a V-shaped box. The ends 2 of the box are crimped together, as shown at 3, forming a tight joint, and the box is made of a single piece of metal, thus reducing the cost of manufacture of the same. The inner oblique wall 4 of the box is made of thin flexible metal, and the upper edge 5 thereof is made perfectly straight, whereby the same, when applied, is readily bent to conform to the shape of the tree or cut in which it is applied, closely fitting the tree and preventing the escape of any turpentine down the side of the tree. The upper edge 6 of the wall 7 of the box is turned over or rolled, as indicated at 8, and rolled therein in a wrought-iron wire 9, thus firmly, yet pivotally, securing the wire to said outer edge. The said wire is bent around the ends of the box and approximately parallel therewith and extends a considerable distance in rear of the inner wall 4 of the box. The inner ends of said wire are bent inward at 10 and sharpened, whereby they may be driven or forced into the side of the tree, firmly holding the box within the scarified portion, yet making the same more readily attached and detached, as will be hereinafter described more fully. The outer wall 7, below the rolled portion and acent each end, is provided with horizontal slots 11, into which pass the tongues 12 and 13, carried by the cover 14. These tongues are bent around said rolled upper end and form hinges for the cover, whereby the same can be swung from over the box. The opposite edge 15 of the cover is made slightly concaved or curved and is provided at the center with a pointed tongue 16, which is adapted to enter the bark of the tree, as shown in Fig. 1, and hold the cover in its closed position. The edge 15, being curved, as shown, allows the outer corners to be bent down around the tree above the box and closely fit the bark of the tree to prevent the water from entering the box. This cover, as will be seen, prevents the water from washing the turpentine from the box and also prevents sticks, &c., from falling into the box and forcing the turpentine out of the same. The cover also prevents the wind from blowing the turpentine out of the box. This also allows of a ready removal of the box for emptying the turpentine therefrom, and thus saving labor and time in collecting the turpentine.

Having thus described my invention, what I claim, and desire to secure by Letters Patent, is—

1. A device of the character described, comprising a box, a wire loop pivotally secured to the outer wall by rolling the end thereof around the same, the ends of the loop forming hooks for securing the box to the tree, the outer wall of said box having slots below the roll, and a cover having tongues passing through the slots around the roll, whereby the cover is swingingly supported by the box.

2. A device of the character described, comprising a V-shaped box formed of a single piece of metal, a wire loop pivotally secured to the outer wall by rolling the upper end thereof around the same, the ends of the loop forming hooks for securing the box to the tree, the outer wall of said box having slots below the roll, and a cover having tongues passing through the slots and bent around the roll, the opposite edge of the cover being curved to conform to the tree, and a pointed tongue carried thereby for holding the cover against the tree.

3. A device of the character described, comprising a box, spring-hooks carried thereby for supporting the same against the tree, a swinging cover carried by said box-like member and of a size greater than that of the box-like member, and adapted to rest against the tree in an inclined position, and prongs carried by the upper end of the cover for securing it to the tree.

4. A device of the character described, comprising a box formed of a single piece of metal, a wire loop pivotally secured to the outer wall by rolling the upper end around the same, the ends of the loop forming hooks for securing the box to the tree, the outer walls of said box having slots below the roll, and a cover of a size greater than the upper end of the box and having tongues passing through the slots and bent around the roll, the opposite edge of the cover being curved to conform to the tree, and a pointed tongue carried thereby for holding the cover against the tree.

In testimony whereof I affix my signature in presence of two witnesses.

WILLIAM EDWARD KENNER.

Witnesses:
   THOS. J. KENNER,
   ROBT. B. WOOD, Jr.